Patented July 19, 1932

1,868,448

UNITED STATES PATENT OFFICE

SOLOMON CAPLAN, OF BROOKLYN, NEW YORK, ASSIGNOR TO COMBUSTION UTILITIES CORPORATION, OF NEW YORK, N. Y., A CORPORATION OF MAINE

RECOVERY OF RESIN FROM RESIDUAL OIL

No Drawing. Application filed November 26, 1928. Serial No. 322,107.

This invention relates to the production of synthetic resins, and more particularly to a method for recovering soluble and fusible resins of the bakelite "A" type from a solution or colloidal suspension thereof in hydrocarbon oil.

It has been previously proposed to produce synthetic resins by direct condensation of the tar acid content of a coal tar distillate with formalin, in the presence of a suitable catalyst. When tar oils such as low temperature tar distillate or the tar acid containing fractions of a coke oven tar are heated with formalin or its equivalent in the presence of a basic catalyst, soluble and fusible ("A" type) condensation products of the tar acid and the formaldehyde are precipitated. On subsequent heating these condensation products may be converted to insoluble, infusible ("C" type) resins. It has been observed that the hydrocarbon oil component of the tar distillate or fraction thus treated, most of which remains as a residual oil after precipitation of the condensation products, usually retains an appreciable portion of condensation product in solution or colloidal suspension. Recovery of the portion of condensation product thus remaining in suspension in the residual oil has been attempted in various ways, for example, by distillation treatment. All methods heretofore proposed for effecting separation of the portion of condensation product thus remaining in colloidal suspension or solution in the residual oil have proven to be impracticable; usually because the treatment impaired the quality of the resins in some way, as by subjecting them to heat sufficient to convert them into an insoluble form. The quantity of resins thus retained in suspension or solution in the residual oil often represents a very considerable proportion (up to 30 to 35%) of the theoretical yield from the coal tar treated. Accordingly recovery of this portion of the condensation product from the residual oil is exceedingly desirable both from the standpoint of increasing the yield of the condensation product and also from the standpoint of effecting purification of the residual oil to enable its further utilization.

The primary object of the present invention is to provide a process whereby the recovery of soluble and fusible resins from solution or colloidal suspension thereof in hydrocarbon oil may be effected without impairment of the quality either of the resins or of the purified oil.

The invention is based on the discovery that agitation of the residual oil remaining after the formaldehyde condensation treatment of a high or low temperature tar distillate (to soft pitch) with a suitable amount of a volatile liquid having a greater solvent action upon the neutral oil than upon the resinous condensation products present therein, such as for example petroleum ether, results in substantially complete gravity separation of any soluble and fusible ("A" type) resin present in suspension or solution in such residual oil without impairing the properties and qualities of the resin. After thus effecting the separation of the condensation product from the residual oil the latter and the petroleum ether or other solvent employed may both be recovered in substantially pure form by known distillation and condensation methods. In place of the petroleum ether or other similar volatile hydrocarbon oils other volatile liquids such as carbon tetrachloride and diethyl ether may be employed. The volatile liquids employed must possess a solvent action upon the neutral oil greater than its solvent action upon the resins. Where other than hydrocarbon solvents are employed it is necessary to use larger quantities thereof than when employing volatile hydrocarbons. For example, while complete precipitation and removal of resinous material from a mixture thereof with neutral oil has been effected by treatment of the latter with as little as one fourth of its volume of petroleum ether,—where carbon tetrachloride was employed, four volumes of the latter, were used for the purpose stated. It is believed that any relatively volatile solvent which is miscible with the said residual oil but in which the condensation products are so slightly soluble that they will precipitate out of the residual oil-volatile solvent solution, may be satisfactorily used. Of the solvents tested for this purpose petroleum oils and in particular the lighter petroleum fractions such as petroleum ether or gasoline have given the most satisfactory results.

Following is an example of one application of the process: 100 cc. of residual oil remaining after a formalin condensation treatment of a primary tar distillate, (the same being the total distillate resulting from the distillation of primary tar to soft pitch, the components of which have a boiling range extending from the initial boiling point of the tar to 300° C.,) was diluted with 200 cc. of petroleum ether (boiling point 40° to 60° C.) and the mixture thus formed, after shaking, was allowed to stand in a separatory funnel for a brief period. A layer of condensation product rapidly settled to the bottom of the separatory funnel and was drawn off. After drying this condensation product on the steam bath it was found to weigh 12.3 grams, representing about 25% of the weight of the main body of resin recovered by the original condensation treatment of the said tar distillate. The petroleum ether was then distilled off from the oil layer remaining in the separatory funnel, leaving as a residue the clear neutral oil substantially free from the resinous condensation product. The petroleum ether thus recovered may be used for treatment of another batch of residual oil.

Specific samples of this recovered neutral oil had a very low viscosity, specific gravities ranging from .92 to .93; and a sulphonation residue of from 33 to 39%. The neutral oils can be used directly as fuel oil,—or, when suitably emulsified with water by means of emulsifying agents such as water soluble soaps, the neutral oil can be employed as the base for spray oils, plant insecticides and lubricants.

Similar results were obtained on heating the oily residue remaining after a formalin condensation of a high temperature coal tar distillate with petroleum ether and with volatile solvents such as described above.

The invention having been thus described, what is claimed as new is:

1. A method of recovering soluble and fusible resinous condensation products from a solution or coloidal suspension thereof in the hydrocarbon oil components of a tar distillate comprising, treating the solution with a volatile liquid which is a solvent for its neutral oil component and in which the resins are substantially insoluble under condition to avoid impairing the quality of the resinous condensation products and to prevent their conversion to the insoluble, infusible form, and thereafter separating the resins by gravity precipitation from the residual oil-volatile solvent solution.

2. A method of recovering soluble and fusible resinous condensation products from a solution or colloidal suspension thereof in the hydrocarbon oil components of a tar distillate comprising, agitating the solution with a volatile petroleum distillate under conditions to avoid the conversion of the resinous condensation products to the infusible, insoluble form and separating the precipitated resin from the residual oil.

3. A method of recovering soluble and fusible resinous condensation products from a solution or colloidal suspension thereof in hydrocarbon oil components of a tar distillate comprising, agitating the solution with petroleum ether under conditions adapted to prevent the conversion of the said resinous condensation products to the insoluble, infusible form and separating the precipitated resin from the petroleum ether-hydrocarbon oil mixture.

4. In the process of producing a fusible, soluble, resinous condensation product direct from a hydrocarbon oil containing tar acids in which the said oil is treated with an aldehyde and a basic catalyst thereby producing a condensation reaction, and the resultant reaction mixture is separated into a plurality of layers, one of which contains hydrocarbon oil having in colloidal solution therein a substantial amount of the said fusible, soluble, resinous condensation product, the steps which comprise treating the said hydrocarbon oil layer with a solvent for the oil in which the resinous condensation product is substantially insoluble under conditions adapted to prevent the conversion of the said condensation product to the insoluble, infusible form, and removing the residual oil from the condensation product thus liberated.

5. In the method of preparing a purified, substantially resin-free hydrocarbon oil from a tar oil containing tar acids in which the said tar oil is treated with an aldehyde and a basic catalyst thereby producing a condensation reaction, and the resultant reaction mixture is separated into a plurality of layers, one of which contains hydrocarbon oil having in colloidal solution or suspension therein a substantial amount of the said resinous condensation product in soluble, fusible form, the steps which comprise treating the said hydrocarbon oil layer with a solvent for the oil in which solvent the said condensation product is substantially insoluble under conditions to precipitate substantially all of the said product from the said oil, and separating the thus precipitated product from the hydrocarbon oil.

In testimony whereof I affix my signature.

SOLOMON CAPLAN.